US010579786B2

(12) United States Patent
Ichikawa et al.

(10) Patent No.: US 10,579,786 B2
(45) Date of Patent: Mar. 3, 2020

(54) INFORMATION PROCESSING SYSTEM

(71) Applicant: SONY CORPORATION, Tokyo (JP)

(72) Inventors: Miwa Ichikawa, Tokyo (JP); Kunihito Sawai, Kanagawa (JP); Yuhei Taki, Kanagawa (JP); Hiroyuki Mizunuma, Tokyo (JP); Taizo Shirai, Kanagawa (JP); Koichi Sakumoto, Tokyo (JP)

(73) Assignee: SONY CORPORATION, Tokyo (JP)

( * ) Notice: Subject to any disclaimer, the term of this patent is extended or adjusted under 35 U.S.C. 154(b) by 100 days.

(21) Appl. No.: 15/127,576

(22) PCT Filed: Mar. 25, 2015

(86) PCT No.: PCT/JP2015/059249
§ 371 (c)(1),
(2) Date: Sep. 20, 2016

(87) PCT Pub. No.: WO2015/151980
PCT Pub. Date: Oct. 8, 2015

(65) Prior Publication Data
US 2017/0147805 A1    May 25, 2017

(30) Foreign Application Priority Data

Apr. 2, 2014  (JP) .................. 2014-076116

(51) Int. Cl.
*G06F 7/04* (2006.01)
*G06F 12/14* (2006.01)
(Continued)

(52) U.S. Cl.
CPC .............. *G06F 21/34* (2013.01); *G06F 21/35* (2013.01); *G06F 21/44* (2013.01);
(Continued)

(58) Field of Classification Search
CPC combination set(s) only.
See application file for complete search history.

(56) References Cited

U.S. PATENT DOCUMENTS 3,277,601 A * 10/1966 Ryan ................. A63H 3/46
                                                    267/153
8,001,613 B2 *  8/2011 Duncan ............... G06F 21/36
                                                    726/17
(Continued)

FOREIGN PATENT DOCUMENTS

JP    2005-339088 A    12/2005
JP    2008-129826 A     6/2008
(Continued)

OTHER PUBLICATIONS

"Lifang Wu, Wenbin Wu, Yali Deng, Chao Liu, Qi Liu, Tracking Deformed object and estimating motion parameters using point correspondence, Oct. 24-28, 2010, IEEE Xplore, INSPEC#11687484" (Year: 2010).*

(Continued)

*Primary Examiner* — Phy Anh T Vu
(74) *Attorney, Agent, or Firm* — Chip Law Group

(57) ABSTRACT

[Object] To provide an information processing system capable of making it difficult to be easily recognized as being a key at a glance by others. [Solution] Provided is an information processing system including a state acquisition unit configured to acquire information on a state of an object, and an authentication information acquisition unit configured to acquire authentication information corresponding to the information on the state of the object acquired by the state acquisition unit. According to such an information processing system, it is made difficult to be easily recognized as being a key at a glance by others.

14 Claims, 11 Drawing Sheets

(51) Int. Cl.
  *G06F 13/00* (2006.01)
  *G06F 17/30* (2006.01)
  *G06F 21/34* (2013.01)
  *G06F 21/35* (2013.01)
  *H04W 12/06* (2009.01)
  *H04L 29/06* (2006.01)
  *G06F 21/44* (2013.01)
  *H04W 12/04* (2009.01)
  *H04W 12/00* (2009.01)

(52) U.S. Cl.
  CPC ......... *H04L 63/0853* (2013.01); *H04W 12/06* (2013.01); *H04L 63/0823* (2013.01); *H04W 12/00508* (2019.01); *H04W 12/04* (2013.01)

(56) References Cited

U.S. PATENT DOCUMENTS

| | | | | |
|---|---|---|---|---|
| 9,204,131 | B2* | 12/2015 | Arrasvuori | G06K 9/00 |
| 9,305,153 | B1* | 4/2016 | Ackerman | G06F 21/34 |
| 2006/0018484 | A1* | 1/2006 | Yoshihiro | G06F 21/34 |
| | | | | 380/277 |
| 2006/0041944 | A1* | 2/2006 | Yano | G06F 21/121 |
| | | | | 726/27 |
| 2007/0165860 | A1* | 7/2007 | Handa | H04L 9/0833 |
| | | | | 380/259 |
| 2007/0226513 | A1* | 9/2007 | Handa | H04L 9/0827 |
| | | | | 713/186 |
| 2007/0283447 | A1* | 12/2007 | Hong | G06F 21/34 |
| | | | | 726/28 |
| 2008/0147344 | A1* | 6/2008 | Kwok | G06K 17/0022 |
| | | | | 702/83 |
| 2008/0276307 | A1* | 11/2008 | Niwata | G06F 21/34 |
| | | | | 726/6 |
| 2008/0301778 | A1* | 12/2008 | Fritz | G06F 21/36 |
| | | | | 726/4 |
| 2009/0027496 | A1* | 1/2009 | Anegawa | G07C 9/00087 |
| | | | | 348/143 |
| 2009/0293119 | A1* | 11/2009 | Jonsson | G06F 21/36 |
| | | | | 726/19 |
| 2010/0033300 | A1* | 2/2010 | Brandin | G06F 21/31 |
| | | | | 340/5.8 |
| 2010/0088699 | A1 | 4/2010 | Sasaki | |
| 2011/0031139 | A1* | 2/2011 | Macor | B01L 3/508 |
| | | | | 206/232 |
| 2011/0088083 | A1* | 4/2011 | Ficko | G06F 21/34 |
| | | | | 726/5 |
| 2012/0008769 | A1* | 1/2012 | Collins | H04L 9/3226 |
| | | | | 380/44 |
| 2012/0081276 | A1* | 4/2012 | Ullrich | G06F 1/1626 |
| | | | | 345/156 |
| 2013/0182897 | A1* | 7/2013 | Holz | G06K 9/00711 |
| | | | | 382/103 |
| 2014/0096215 | A1* | 4/2014 | Hessler | H04L 63/0869 |
| | | | | 726/7 |
| 2015/0026785 | A1* | 1/2015 | Soon-Shiong | G06Q 30/0207 |
| | | | | 726/7 |
| 2018/0012009 | A1* | 1/2018 | Furman | G06F 21/32 |
| 2019/0156064 | A1* | 5/2019 | Hansen | G06F 21/32 |

FOREIGN PATENT DOCUMENTS

| | | |
|---|---|---|
| JP | 2013-080528 A | 5/2013 |
| JP | 2013-109776 A | 6/2013 |
| JP | 5446860 B2 | 3/2014 |
| WO | 2008/117500 A1 | 10/2008 |

OTHER PUBLICATIONS

"S.D. Mowbray, M.S. Nixon, Extraction and recognition of periodically deforming objects by continuous, spatio-temporal shape description, Jun. 27-Jul. 2, 2004, IEEE Xplore, INSPEC#8161561" (Year: 2004).*

International Search Report and Written Opinion of PCT Application No. PCT/JP2015/059249, dated Jun. 9, 2015, 6 pages English Translation and 6 pages ISRWO.

* cited by examiner

FIG.3

```
ID 0001093392239
PIN 4829
```

| SERVICE NAME : ID : PASSWORD |
|---|
| Service 1 : aaaa@xx : KtutLjTx
Service 2 : aaaa@xx: 1PDKWxsu
Service 3 : aaaa@xx : JbJdU2al
Service 4 : aaaa@xx : sUGMTaEx
⋮         ⋮          ⋮ |
| PUBLIC KEY/SECRET KEY |
| PUBLIC KEY PK : 59YGoVWgfqhL88
SECRET KEY SK : QqilgvJcf8cvbz |

FIG.4

| OBJECT SHAPE ID | OBJECT SHAPE | SECRET KEY sk | PUBLIC KEY pk |
|---|---|---|---|
| 01 | PART A: ANGLE OF 0 DEG.<br>PART B: ANGLE OF 45 DEG.<br>PART C: ANGLE OF 60 DEG.<br>... | QqilgvJcf8cvbz | 59YGoVWgfqhL88 |
| 02 | PART A: ANGLE OF 45 DEG.<br>PART B: ANGLE OF 0 DEG.<br>PART C: ANGLE OF 30 DEG.<br>... | Msehej6fheks | Nheis62kehwop5h2 |

| AUTHENTICATION DESTINATION / OBJECT SHAPE ID | 01 | 02 |
|---|---|---|
| PC | O | |
| Web SERVICE | O | |
| ATM OF BANK A | | O |
| HOUSE ENTRANCE | | O |

STATE 1

STATE 2

STATE 3

INFORMATION PROCESSING SYSTEM

CROSS REFERENCE TO RELATED APPLICATIONS

This application is a U.S. National Phase of International Patent Application No. PCT/JP2015/059249 filed on Mar. 25, 2015, which claims priority benefit of Japanese Patent Application No. 2014-076116 filed in the Japan Patent Office on Apr. 2, 2014. Each of the above-referenced applications is hereby incorporated herein by reference in its entirety.

TECHNICAL FIELD

The present disclosure relates to an information processing system and a computer program.

BACKGROUND ART

Technologies that allow a single key to have a plurality of functions have been developed. As one example, Patent Literature 1 discloses the technology of a keyless entry system capable of outputting different operating commands depending on the position of an operation member.

CITATION LIST

Patent Literature

Patent Literature 1: JP 2006-125123A

SUMMARY OF INVENTION

Technical Problem

A key in related art is easily recognizable as being a key at a glance from its shape. In a key in related art, how to use can be easily expected from its shape in such a way that unlocking is done by inserting the key into a keyhole and turning it. Thus, if an object such as a key and a keyhole that can be opened with the key is known, the lock is immediately opened.

The key in related art is used to lock and unlock one object. Thus, as the number of objects to be used for locking and unlocking increases, the number of keys increases. Most keys are similar in shape, and thus, if there are several keys, it will be difficult to determine which of these keys corresponds to which object. As one example, when a desk key and a locker key are similar in shape, it is difficult to immediately distinguish between the desk key and the locker key.

The key in related art is often duplicated to lock and unlock the same object. As one example, a family of four may duplicate a door key to allow all to have their individual keys. However, such key duplication will make it difficult to know who is holding which key.

Therefore, an embodiment of the present disclosure provides a novel and improved information processing system and computer program capable of making it difficult to be easily recognized as being a key at a glance by others.

Solution to Problem

According to the present disclosure, there is provided an information processing system including a state acquisition unit configured to acquire information on a state of an object, and an authentication information acquisition unit configured to acquire authentication information corresponding to the information on the state of the object acquired by the state acquisition unit.

According to the present disclosure, there is provided an information processing system including a state acquisition unit configured to acquire information on a state of an object, and an authentication information registration unit configured to register authentication information in association with the information on the state of the object acquired by the state acquisition unit, the authentication information being used for an authentication process.

According to the present disclosure, there is provided a computer program for causing a computer to execute acquiring information on a state of an object, and acquiring authentication information that matches the acquired information on the state of the object, the authentication information corresponding to the information on the state of the object.

According to the present disclosure, there is provided a computer program for causing a computer to execute acquiring information on a state of an object, and registering authentication information in association with the acquired information on the state of the object, the authentication information being used for an authentication process.

Advantageous Effects of Invention

According to the embodiments of the present disclosure described above, it is possible to provide a novel and improved information processing system and computer program capable of making it difficult to be easily recognized as being a key at a glance by others.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 3 is a diagram illustrated to describe an example of information stored in a storage unit 150.

FIG. 4 is a diagram illustrated to describe an example of information stored in the storage unit 150.

DESCRIPTION OF EMBODIMENT(S)

Hereinafter, (a) preferred embodiment(s) of the present disclosure will be described in detail with reference to the appended drawings. In this specification and the drawings, elements that have substantially the same function and structure are denoted with the same reference signs, and repeated explanation is omitted.

The description will be given in the following order.
1. Background of present Disclosure
2. Embodiments of present Disclosure
   2.1. Exemplary System Configuration
   2.2. Exemplary Functional Configuration
   2.3. Operation Example
   2.4. Registration Example of Authentication Information
3. Conclusion <1. Background of Present Disclosure>

The background of the present disclosure will be described, and then embodiments of the present disclosure will be described in detail.

When it is possible to change information to be used for an authentication process depending on the state of an object having a function to execute the authentication process, the authentication process is performed in a single object with a plurality of authentication destinations. In the future, it is considered that the user can easily create an object having the user's favorite shape. The existing key is easily recognizable by others as being a key at first glance from its shape. Registering the information to be used for authentication in the object created by the user himself and performing the authentication process with an authentication destination make it difficult for others to recognize that the object is to be subject to the authentication process.

From the above point of view, those who provide the present disclosure have found a technology capable of making it difficult to be easily distinguished as being a key at a glance by others and of changing information to be used for authentication depending on the state of an object. Thus, as described below, the technology has been made capable of changing the information to be used for authentication depending on the state of an object.

<2. Embodiments of Present Disclosure>

[2.1. Exemplary System Configuration]

Figure 1:
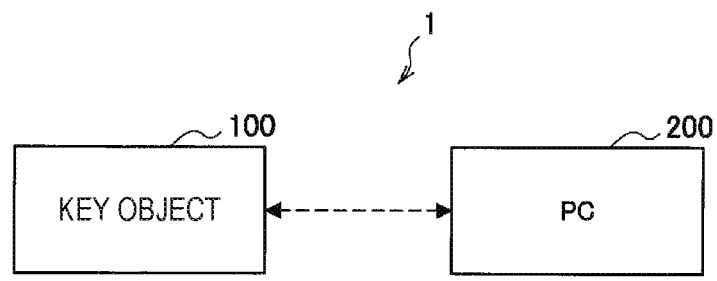
FIG. 1 is a diagram illustrated to describe the overall configuration example of an information processing system 1 according to an embodiment of the present disclosure.

An exemplary configuration of an information processing system according to an embodiment of the present disclosure will be described with reference to the drawings. FIG. 1 is a diagram illustrated to describe the overall configuration example of an information processing system 1 according to an embodiment of the present disclosure. The overall configuration of the information processing system 1 according to an embodiment of the present disclosure will be described with reference to FIG. 1.

As illustrated in FIG. 1, the information processing system 1 according to an embodiment of the present disclosure is configured to include a key object 100 and a personal computer (PC) 200. The key object 100 is an example of an object according to an embodiment of the present disclosure. The PC 200 is an example of a device for performing an authentication process according to an embodiment of the present disclosure and is an example of a device at an authentication destination.

The information processing system 1 according to an embodiment of the present disclosure is a system that performs authentication of the user intended to be used by password authentication scheme, common-key authentication scheme, public-key authentication scheme, digital signature scheme, or the like, when the user uses a service provided by PC 200. In the password authentication scheme, the key object 100 holds a set of an ID and a password and transmits the ID and password to the PC 200 when authentication is performed. In the public authentication scheme, the key object 100 is a device that generates a pair of keys, public key pk and secret key sk, or holds the key pair. When a service provided by the PC 200 is used, the key object 100 transmits only the public key pk of the generated key pair to the PC 200. The key object 100 may be any object as long as it can hold the information used to obtain authentication as described later.

The key object 100 can generate and hold not only one key pair but also a plurality of key pairs. It is possible for the key object 100 that generates and holds a plurality of key pairs to set different public keys pks to each of the plurality of services that obtain the authentication.

The PC 200 is a device that performs authentication using a password authentication scheme, common-key authentication scheme, public-key authentication scheme, or digital signature scheme. The PC 200, when authenticating the key object 100 using the public-key authentication scheme as one example, previously holds the public key pk, which is generated by the key object 100 and is registered from the key object 100. The PC 200 performs authentication of the user intended to use a service using the public key pk registered from the key object 100 and the information generated by using the secret key sk corresponding to the public key pk generated by the key object 100. In other words, the PC 200 performs the authentication that uses a response acquired from the key object 100 to a challenge transmitted from the PC 200 to the key object 100 by using the public key pk. In the present embodiment, the public-key authentication scheme is not limited to particular ones. As one example, RSA cryptography may be employed, or elliptic curve cryptography may be employed. Although it will be described in detail later, the public-key authentication scheme that takes the difficulty of solving a multi-order multivariate simultaneous equation as a basis for security may be employed, which is disclosed in JP 2012-098690A, as one example.

The PC 200, when authenticating the key object 100 using the password authentication scheme, acquires an ID and a password to use the PC 200 from the key object 100 and performs an authentication process using the acquired ID and password.

Examples of a service provided from the PC 200 may include logging in or unlocking the PC 200, execution of an application installed in the PC 200, playing back content (e.g., music data, still image data, moving image data, electronic book data, etc.) on the PC 200, or the like. Examples of the process of playing back content on the PC 200 may include a process of playing back music or moving image, a process of displaying an image, and a process of playing back electronic books. The user of the PC 200 is able to generate a key pair consisting of the public key pk and the secret key sk using the key object 100 and register the public key pk in the PC 200. Thus, it is possible to lock the logging in or unlocking the PC 200, execution of an application installed in the PC 200, playing back content on the PC 200, or the like, as described above. The PC 200, when intending to execute the locked service, transmits a request for authentication request to the key object 100 having the secret key sk corresponding to the public key that is set for the service and determines whether there is authority to execute the service using an answer from the key object 100.

The key object 100 is an object in which a state such as operation part, shape, or inclination is changeable by the user. As one example, the key object 100 may be an object with at least a portion deformable by the user. The key object 100 acquires a state of the shape changed by the user using a sensor or the like, selects information to be used for an authentication process with the PC 200 (also referred to as "authentication information" hereinafter) depending on the acquired state, and performs the authentication process with the PC 200 using the selected information.

Examples of the object that can be used as the key object 100 include an object, such as a doll, having a portion that can be rotated or deformed, and an object such as a cubic puzzle, and a soft object, wire, and string, having a portion that can be rotated. The object that can be used as the key object 100 may be provided with a chip in which authentication information is stored or may be provided with a sensor used to recognize the state of the key object 100, which allows acquisition of a state of the shape of the key object 100 and selection of information depending on the acquired state.

As one example, an object with at least a deformable portion that is created in any shape by the user using a 3D printer or the like can be used as the key object 100. Such an object that is created in any shape by the user is provided with a sensor and a chip having authentication information stored therein, which allows acquisition of a state of the shape of the key object 100 and selection of information depending on the acquired state.

The communication between the key object 100 and the PC 200 is performed in wireless communication, but it may be performed in wired communication. In the following description, unless otherwise specified, it is based on the assumption that the communication between the key object 100 and the PC 200 is performed in wireless communication. The wireless communication between the key object 100 and the PC 200 may be performed using wireless LAN, Bluetooth (registered trademark), ZigBee (registered trademark), near field communication (NFC), or the like.

In the information processing system 1 according to an embodiment of the present disclosure, the information used for the authentication process is registered and a component such as a chip that can use the information is mounted on the key object 100. Thus, various types of objects can be used as a key for performing authentication in the PC 200. The shape of the key object 100 is determined in using the information used for the authentication process depending on the user's intended use and preferences, and thus it is possible to easily identify the user's own possession or usage.

The information processing system 1 according to an embodiment of the present disclosure can change a use of a key by changing a state of the key object 100 such as operation portion, shape, or inclination. Thus, a single key object 100 can serve as a plurality of keys. It makes difficult for others to determine which object corresponds to a key and to expect a way of operating the key. Thus, the information processing system 1 according to an embodiment of the present disclosure can ensure the user to give secure use of the key.

An example of the overall configuration of the information processing system 1 according to an embodiment of the present disclosure has been described with reference to FIG. 1. An exemplary functional configuration of the key object 100 according to an embodiment of the present disclosure will be described.

[2.2. Exemplary Functional Configuration]

Figure 2:
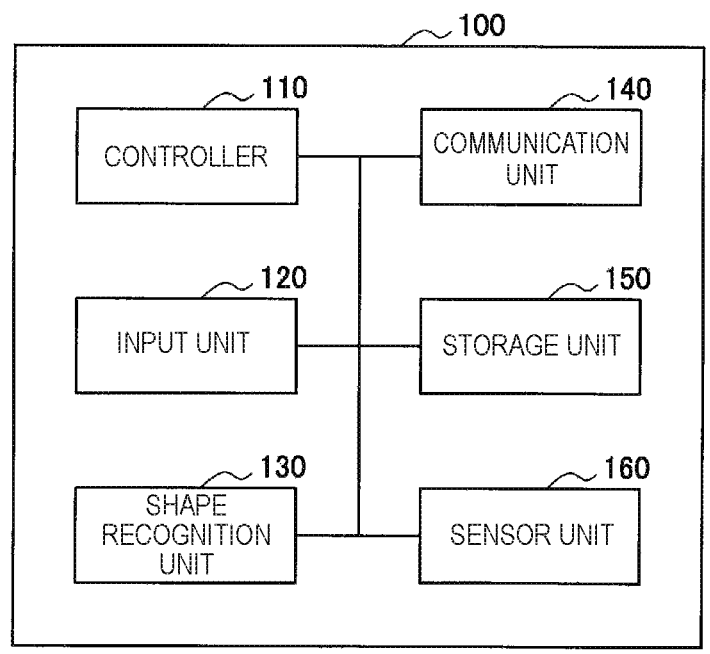
FIG. 2 is a diagram illustrated to describe an exemplary functional configuration of a key object 100 according to an embodiment of the present disclosure.

FIG. 2 is a diagram illustrated to describe an exemplary functional configuration of the key object 100 according to an embodiment of the present disclosure. An exemplary functional configuration of the key object 100 according to an embodiment of the present disclosure will be described with reference to FIG. 2.

The key object 100 illustrated in FIG. 2 is an object with at least a portion that is deformable by the user as described above and is capable of selecting authentication information depending on the object's state.

As illustrated in FIG. 2, the key object 100 according to an embodiment of the present disclosure is configured to include a controller 110, an input unit 120, a shape recognition unit 130, a communication unit 140, a storage unit 150, and a sensor unit 160.

The controller 110 controls the operation of the key object 100. In other words, each component of the key object 100 illustrated in FIG. 1 is operated under the control of the controller 110. The controller 110 is composed of a microcomputer that includes a central processing unit (CPU), read only memory (ROM), random access memory (RAM), a nonvolatile memory unit, and an interface unit, and can function as a control unit that controls the entire configuration of the present embodiment. The detailed functional configuration of the controller 110 will be described later.

The input unit 120 receives an input operation performed by the user. If the key object 100 is a doll with hands and feet deformable at any angle by the user as one example, the hands and feet of the doll may be the input unit 120. If the key object 100 is a soft object such as a rubber ball as one example, the object's surface itself may be the input unit 120. When the key object 100 is deformed by an input operation to the input unit 120, data corresponding to the deformation is obtained by a sensing operation in the sensor unit 160 described later.

The shape recognition unit 130 recognizes the shape of the key object 100. The shape recognition unit 130 recognizes the shape of the key object 100 using sensing information acquired by the sensor unit 160. The shape recognition unit 130 transmits information on a shape of the key object 100, which is recognized using the sensing information acquired by the sensor unit 160. The controller 110 selects the authentication information to be used for the authentication process with the PC 200 based on the information on the shape of the key object 100 recognized by the shape recognition unit 130 as information on the shape of the key object 100.

The communication unit 140 transmits and receives data to and from an external device. Examples of an external device include a computer apparatus, smartphone, smart watch, and network server. The communication unit 140 may be configured to perform network communication with a network access point via short-range wireless communication, as one example, using wireless LAN or Bluetooth (registered trademark) technology, or may be configured to perform wireless communication directly with an external device provided with a corresponding communication function. The communication unit 140 transmits and receives information relating to the authentication process with an external device, which uses the information selected by the controller 110.

The storage unit 150 may be composed of read only memory (ROM), random access memory (RAM), a non-volatile memory unit, or the like. The storage unit 150 stores information used to control the key object 100 by the controller 110, computer-use data, such as image data, text data, and spreadsheet data, generated in the key object 100, application data executed in the key object 100, or the like. The storage unit 150 also stores information that is necessary when the PC 200 is authenticated, such as an ID, a password, and a secret key. An area of the storage unit 150 in which the secret key generated by the controller 110 is stored is desirable to have tamper resistance. Not only the area of the storage unit 150 in which an ID, a password, a secret key, or the like is stored, but also the entire storage unit 150 may have tamper resistance, or the entire controller 110 or the entire key object 100 may have tamper resistance.

Figures 5, 6:
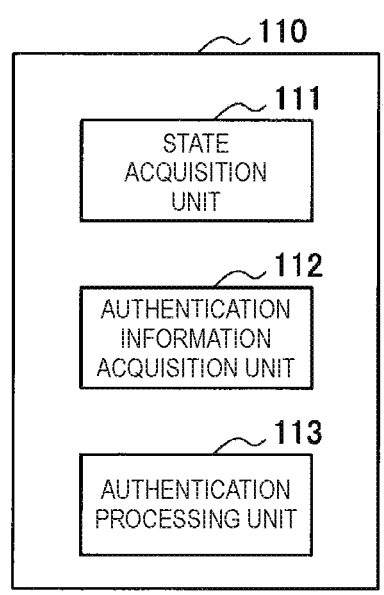
FIG. 5 is a diagram illustrated to describe an example of information stored in the storage unit 150.
FIG. 6 is a diagram illustrated to describe an exemplary functional configuration of a controller 110 included in the key object 100 according to an embodiment of the present disclosure.

FIGS. 3 to 5 are diagrams illustrated to describe an example of the information stored in the storage unit 150. FIG. 3 illustrates, as an example of the information stored in the storage unit 150, a user ID, a personal identification number (PIN), the ID and password to use a service provided by a server device 300, and a combination of public key pk and secret key sk when the authentication is obtained using the public-key authentication scheme. Not all these information are necessary to be stored in the storage unit 150.

The number of the secret keys sks stored in the storage unit 150 is not limited to one, but a plurality of the secret keys sks may be stored. The secret key sk that is stored in the storage unit 150 may be set to an available state or may be set to an unavailable state. Furthermore, when the secret key sk is in an available state, whether to perform automatically the authentication process using the secret key sk may be set. When the secret key sk is in an available state and the autonomous execution of the authentication process using the secret key sk is set, the key object 100 generates a response using the secret key sk automatically without any acknowledgement of the user to a challenge from the PC 200 and returns the response to the PC 200.

FIG. 4 illustrates an example of the table in which an object shape ID for uniquely identifying a shape, an object shape of the key object 100 corresponding to the object shape ID, and a combination of public key pk and secret key sk are registered, as an example of the information stored in the storage unit 150. FIG. 5 illustrates an example of the table in which the correspondence relationship between the object shape ID and an authentication destination to be authenticated using the key object 100 is registered.

An example of the object shape ID, the object shape of the key object 100 corresponding to the object shape ID, and a set of public key pk and secret key sk is described with reference to FIG. 4. When the key object 100 is an object having at least three portions that are capable of being rotated, it is possible for the key object 100 to register, as the object shape ID "01", the state in which these portions A, B, and C are set at angles of 0, 45, 60 degrees, respectively. When the angles of these portions A, B, and C corresponding to the object shape ID "01" are set by the user, the key object 100 uses the secret key sk and the public key pk corresponding to the object shape ID "01".

Similarly, it is possible for the key object 100 to register, as the object shape ID "02", the state in which these portions A, B, and C are set at angles of 45, 0, 30 degrees, respectively. When the angles of these portions A, B, and C corresponding to the object shape ID "02" are set by the user, the key object 100 uses the secret key sk and public key pk corresponding to the object shape ID "02".

Then, an example of the table in which the correspondence relationship between the object shape ID and an authentication destination in which authentication is to be performed using the key object 100 is registered will be described with reference to FIG. 5. As one example, when a PC or Web service is an authentication destination, the object shape ID "01" corresponds to this authentication destination. Similarly, when a bank ATM or a house entrance is an authentication destination, the object shape ID "02" corresponds to this authentication destination. When the angles of these portions A, B, and C corresponding to the object shape ID "01" are set by the user, the key object 100 is a key object used for the authentication process in accessing a PC or Web service that is an authentication destination corresponding to the object shape ID "01". When the angles of these portions A, B, and C corresponding to the object shape ID "02" are set by the user, the key object 100 is a key object used for the authentication process in accessing a bank ATM or a house entrance that is an authentication destination corresponding to the object shape ID "02" is used.

In other words, when the angle of the portion is set to satisfy a condition of an object shape ID, the key object 100 functions as a key object for the authentication destination corresponding to the object shape ID. However, the key object 100 fails to function as a key object for the authentication destination corresponding to other object shape IDs.

Although FIG. 4 illustrates an example in which the secret key sk and the public key pk corresponding to the object shape ID are registered without modification, an embodiment of the present disclosure is not limited thereto. As one example, an ID for a set of secret key sk and public key pk may be set in another table, and the ID for the set of secret key sk and public key pk may be registered in the table shown in FIG. 4. Although FIG. 4 illustrates the secret key sk and the public key pk as the authentication information corresponding to the object shape ID, a password or other information as the authentication information may be associated with the object shape ID.

The sensor unit 160 is a sensor configured to detect the movement of the key object 100. The sensor unit 160 may be composed of at least one sensor selected from sensors including an acceleration sensor, gravity sensor, gyro sensor, pressure sensor, illuminance sensor, linear acceleration sensor, geomagnetic sensor, proximity sensor, and rotary vector sensor. The sensor unit 160 may be composed of a sensor for acquiring the current position, for example, a GPS module. The sensor unit 160 may measure the current position with the positioning technology using Wi-Fi (e.g., the PlaceEngine (registered trademark)) or may measure the current position by communication with a beacon having position information using Bluetooth (registered trademark). Sensor data is obtained by a sensing operation in the sensor unit 160 is provided for the shape recognition unit 130 as described above.

As one example, as described later, when the key object 100 is a doll, the sensor unit 160 may be composed of a sensor for detecting the state of rotation of the doll's arm or legs. The sensor unit 160 may be composed of a proximity sensor for detecting a contact with the surface of the doll or a gravity sensor for detecting the doll's state such as standing and sleeping, in addition to the sensor for detecting the state of rotation of the doll's arm, leg, or neck. The sensor unit 160 may be composed of a sensor for detecting the pressure applied to the key object 100.

The shape recognition unit 130 may send the sensor data obtained by the sensing operation in the sensor unit 160 without modification. Alternatively, the shape recognition unit 130 acquires an object shape ID from the storage unit 150 based on the sensor data obtained by the sensing operation in the sensor unit 160 and may send the acquired object shape ID to the controller 110.

The key object 100 according to an embodiment of the present disclosure having the configuration as described above makes it possible to perform the authentication process with the PC 200 using authentication information corresponding to the preset shape and other states of the key object 100. The shape of the key object 100 is determined in using the information used for the authentication process depending on the user's intended use and preferences, and thus it is possible to easily identify the user's own possession or usage.

An exemplary functional configuration of the key object 100 according to an embodiment of the present disclosure has been described with reference to FIG. 2. Then, an exemplary functional configuration of the controller 110 included in the key object 100 according to an embodiment of the present disclosure will be described.

FIG. 6 is a diagram illustrated to describe an exemplary functional configuration of the controller 110 included in the key object 100 according to an embodiment of the present disclosure. An exemplary functional configuration of the controller 110 included in the key object 100 according to an embodiment of the present disclosure will be described with reference to FIG. 6.

As illustrated in FIG. 6, the controller 110 included in the key object 100 according to an embodiment of the present disclosure is configured to include a state acquisition unit 111, an authentication information acquisition unit 112, and an authentication processing unit 113.

The state acquisition unit 111 acquires information about the state of the key object 100, for example, information about the shape of the key object 100 acquired by the shape recognition unit 130. The state acquisition unit 111 sends the acquired information about the state of the key object 100 to the authentication information acquisition unit 112.

The authentication information acquisition unit 112 acquires authentication information from the storage unit 150 based on the information about the state of the key object 100 sent from the state acquisition unit 111. When the information about the state of the key object 100 acquired by the state acquisition unit 111 corresponds to the object shape ID "01" shown in FIG. 4 as one example, the authentication information acquisition unit 112 acquires authentication information associated with the object shape ID "01".

As described above, the shape recognition unit 130 may send the sensor data obtained by the sensing operation in the sensor unit 160 to the controller 110 without modification. Alternatively, the shape recognition unit 130 may acquire the object shape ID from the storage unit 150 based on the sensor data obtained by the sensing operation in the sensor unit 160 and may send the acquired object shape ID to the controller 110. Thus, when the state acquisition unit 111 acquires the sensor data obtained by the sensing operation in the sensor unit 160, the authentication information acquisition unit 112 acquires the object shape ID from the storage unit 150 based on the sensor data and then acquires the authentication information associated with the object shape ID from the storage unit 150. When the state acquisition unit 111 acquires the object shape ID, the authentication information acquisition unit 112 acquires the authentication information associated with the object shape ID from the storage unit 150 by using the object shape ID.

The authentication processing unit 113, when receiving an authentication request transmitted from the PC 200, performs the authentication process with the PC 200 using the information stored in the storage unit 150 (the ID and password, or the secret key sk). When the authentication is performed in the PC 200 using the password authentication scheme, the authentication processing unit 113 transmits the ID and password stored in the storage unit 150 to the PC 200. When the authentication is performed in the PC 200 using the public-key authentication scheme, the authentication processing unit 113 performs a process for generating a response to the authentication request from the PC 200 using the secret key sk. The response generated by the authentication processing unit 113 is transmitted to the PC 200 via the communication 140. The PC 200 performs a process for authenticating the key object 100 depending on whether the response generated by the authentication processing unit 113 is correct or not.

The controller 110 included in the key object 100 according to an embodiment of the present disclosure having the configuration as described above makes it possible to acquire the information about the shape of the key object 100 and to perform the authentication process with the PC 200 using the authentication information corresponding to the predetermined shape.

An exemplary functional configuration of the controller 110 included in the key object 100 according to an embodiment of the present disclosure has been described with reference to FIG. 6. Then, an exemplary functional configuration according to an embodiment of the present disclosure of the PC 200 according to an embodiment of the present disclosure will be described.

Figure 7:
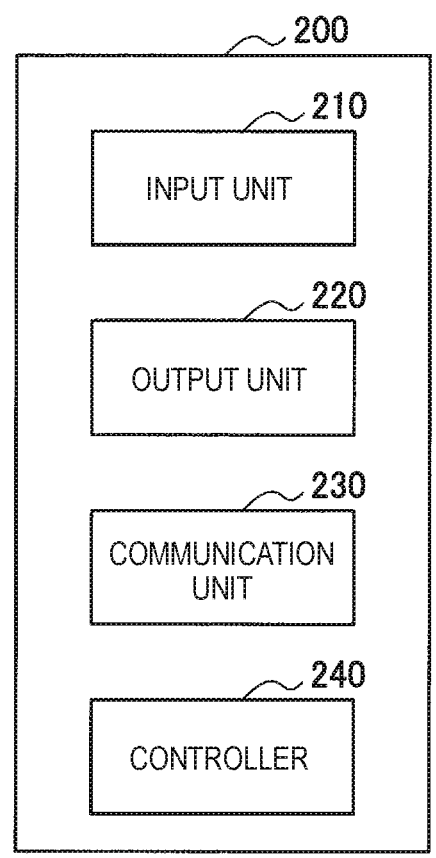
FIG. 7 is a diagram illustrated to describe an exemplary functional configuration of a PC 200 according to an embodiment of the present disclosure.

FIG. 7 is a diagram illustrated to describe an exemplary functional configuration of the PC 200 according to an embodiment of the present disclosure. An exemplary functional configuration of the PC 200 according to an embodiment of the present disclosure will be described with reference to FIG. 7.

As illustrated in FIG. 7, the PC 200 according to an embodiment of the present disclosure is configured to include an input unit 210, an output unit 220, a communication unit 230, and a controller 240.

The input unit 210 receives information that is inputted to the PC 200. Examples of the information received by the input unit 210 include text information, pattern information, biometric information, or the like. The input unit 210 may be composed of a keyboard, a mouse, a touch panel, a fingerprint sensor, a vein sensor, a camera, or the like. The information received by the input unit 210 is processed appropriately in the controller 240, and is outputted from the output unit 220 or is transmitted via the communication unit 230.

The output unit 220 is an output device that outputs the information processed by the PC 200. The output unit 220 may be composed of a liquid crystal display, an organic EL display, a speaker, a LED indicator, a vibrator, or the like. The things outputted from the output unit 220 may be generated, as one example, by the controller 240.

The communication unit 230 transmits and receives data to and from an external device, for example, the key object 100. The communication unit 230 may be configured to perform network communication with a network access point via short-range wireless communication using the technique such as wireless LAN and Bluetooth (registered trademark), or may be configured to perform wireless communication directly with an external device provided with a corresponding communication function.

The controller 240 controls the operation of the PC 200. In other words, each component of the PC 200 illustrated in FIG. 7 is operated under the control of the controller 240. The controller 240 is composed of a microcomputer that includes a CPU, ROM, RAM, a nonvolatile memory unit, and an interface unit, and can function as a control unit that controls the entire configuration of the present embodiment.

The PC 200 performs the authentication process with the key object 100. In this case, the authentication process between the PC 200 and the key object 100 is performed under the control of the controller 240.

The PC 200 according to an embodiment of the present disclosure having the configuration as illustrated in FIG. 7 makes it possible to perform the authentication process with the key object 100.

An exemplary functional configuration of the PC 200 according to an embodiment of the present disclosure has been described with reference to FIG. 7. Then, the operation example of the key object 100 according to an embodiment of the present disclosure will be described.

[2.3. Operation Example]

Figure 8:
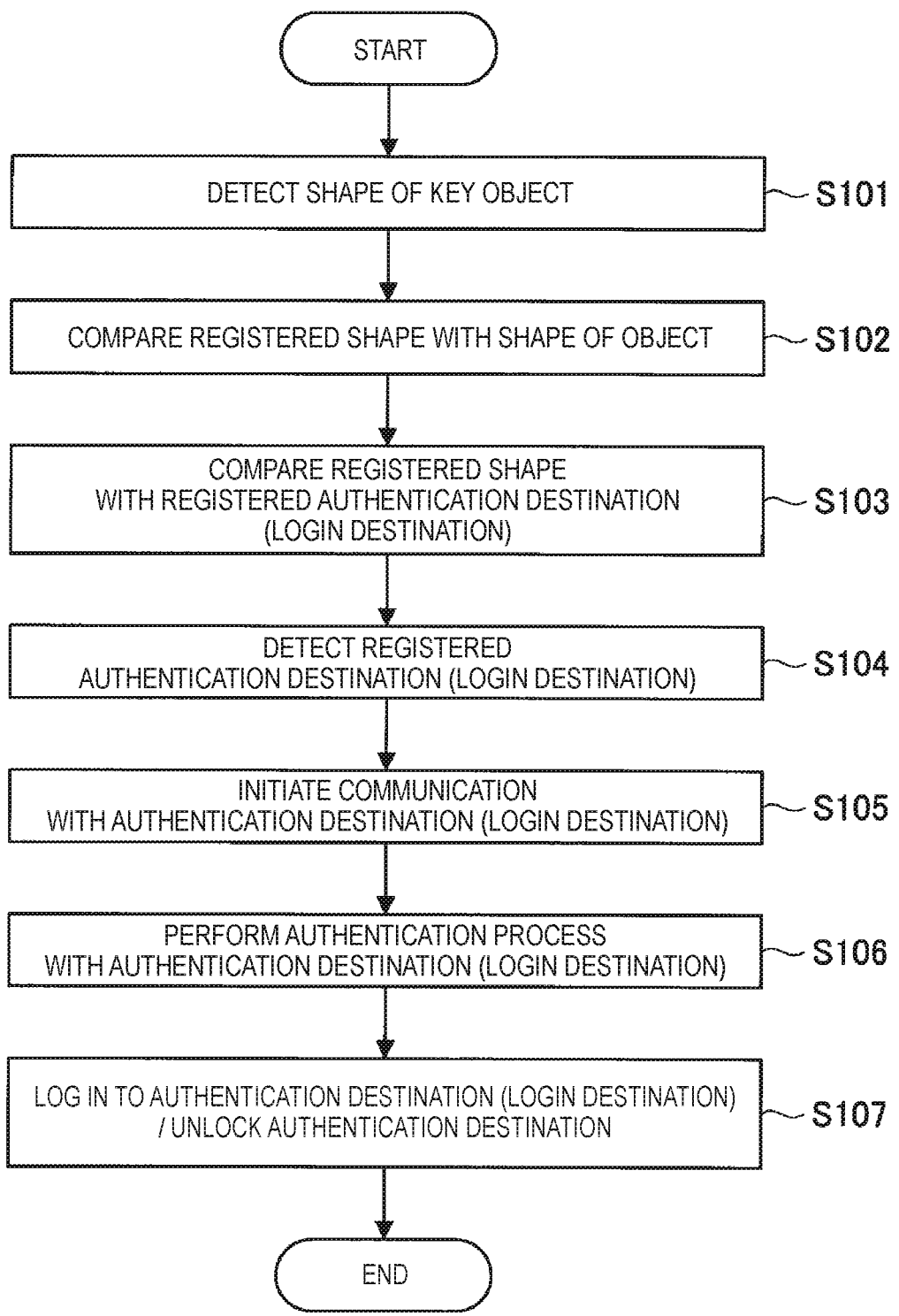
FIG. 8 is a flowchart illustrating an operation example of the key object 100 according to an embodiment of the present disclosure.

FIG. 8 is a flowchart illustrating an operation example of the key object 100 according to an embodiment of the present disclosure. FIG. 8 illustrates an operation example of the key object 100 when the authentication information is selected based on the shape of the key object 100 and the authentication process with the PC 200 is performed based on the selected authentication information. An operation example of the key object 100 according to an embodiment of the present disclosure will be described with reference to FIG. 8.

The key object 100 detects the shape of the key object 100 when the authentication information is selected based on the shape of the key object 100 and the authentication process with the PC 200 is performed based on the selected authentication information (step S101). The detection process in step S101 may be performed by the shape recognition unit 130 based on the sensor data acquired by the sensor unit 160, as one example, or may be performed by the state acquisition unit 111.

When the shape of the key object 100 is detected in step S101, then the key object 100 compares a shape of the key object 100 registered previously in the storage unit 150 with the shape of the key object 100 detected in step S101 (step S102). The comparison process in step S102 may be performed, as one example, by the authentication information acquisition unit 112. The comparison process in step S102 allows the key object 100 to acquire the object shape ID corresponding to the shape of the key object 100 detected in step S101.

When the comparison process in step S102 is performed, then the key object 100 compares the shape of the key object 100, which is registered previously in the storage unit 150 and matches the shape of the key object 100 detected in step S101, with the authentication destination (login destination) registered previously in the storage unit 150 (step S103). The comparison process in step S103 is performed, as one example, by the authentication information acquisition unit 112. The key object 100 detects the authentication destination (login destination) registered previously in the storage unit 150 based on the comparison process in step S103 (step S104). The key object 100 can acquire the object shape ID by performing the comparison process in step S102, and thus it is possible to detect the authentication destination (login destination) corresponding to the acquired object shape ID.

Figure 9:
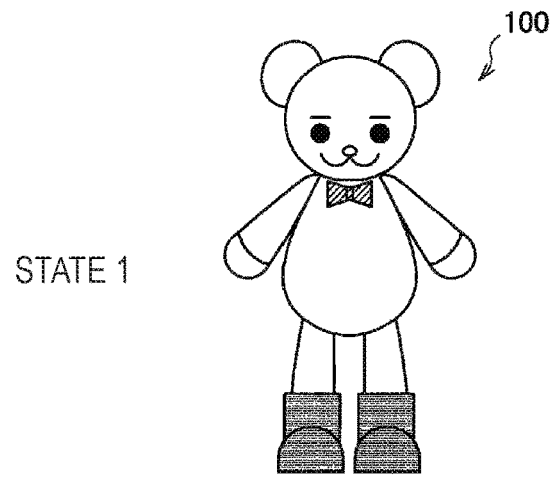
FIG. 9 is a diagram illustrated to describe an example of difference in shape of the key object 100.
Figure 9:
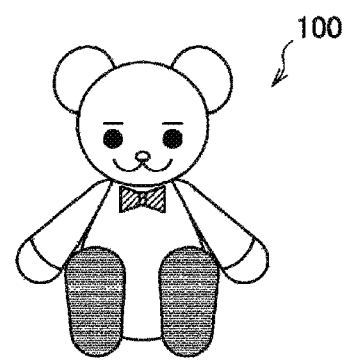
Figure 9:
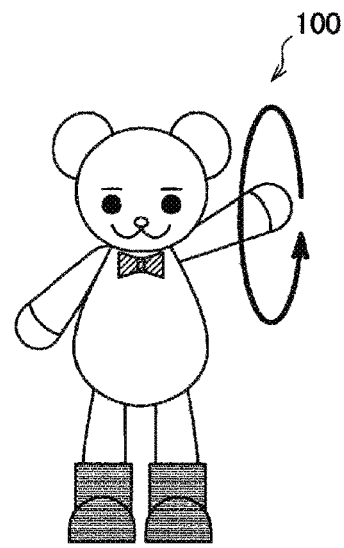

FIG. 9 is a diagram illustrated to describe an example of difference in shape of the key object 100. FIG. 9 illustrates a doll with freely rotatable hands and feet as the key object 100, and illustrates three types of shape of the key object 100. The state 1 shows a state in which the doll is standing, the state 2 shows a state in which the doll is sitting, and the state 3 shows a state in which the doll's arm is swinging around by the user.

When the key object 100 detects that the shape of the key object 100 is the state 1 as one example in step S101, the key object 100 compares, in step S102, the detected shape with the shape of the key object 100 registered previously in the storage unit 150. Further, the key object 100 compares, in step S103, the shape of the key object 100 obtained by the comparison process in step S102 with the authentication destination (login destination) registered previously in the storage unit 150.

If it is determined in a series of processes that the state 1 shown in FIG. 9 indicates a shape used to open a house key as one example, the key object 100 performs the authentication process described later with the house key. If it is determined in a series of processes that the state 2 shown in FIG. 9 indicates a shape used to log in to a PC in an office or to open a web site in the PC as one example, the key object 100 performs the authentication process described later with the PC. If it is determined in a series of processes that the state 3 shown in FIG. 9 indicates a shape used to access a bank's ATM as one example, the key object 100 performs the authentication process described later with the bank's ATM.

In this way, it is possible for the key object 100 to select different kinds of authentication information depending on difference in its shape or state, thereby performing the authentication process with different authentication destinations.

When the authentication destination (login destination) registered previously in the storage unit 150 is detected by the detection process in step S104, then the key object 100 initiates communication with the detected authentication destination (login destination) (step S105). As one example, if it is detected that the authentication destination (login destination) is the PC 200 by the detection process in step S104, the key object 100 initiates communication with the PC 200.

When the communication with the authentication destination (login destination) is initiated in step S105, the key object 100 performs a predetermined authentication process with the authentication destination (login destination) (step S106). When the authentication process in step S106 is completed successfully, the key object 100 can log in to the authentication destination (login destination) or can unlock the authentication destination (login destination) (step S107). The content of the authentication process between the key object 100 and the authentication destination (login destination) varies with the authentication information registered previously in the key object 100.

When it is detected that the authentication destination (login destination) is the PC 200 by the detection process in step S104, the key object 100 performs the authentication process described below with the PC 200.

If the authentication process between the key object 100 and the PC 200 is performed using the password authentication scheme, the key object 100 transmits the user ID and password of the PC 200 stored in the storage unit 150 to the PC 200 in step S106. The PC 200 performs the authentication process using the user ID and password transmitted from the key object 100. If the combination of the user ID and password transmitted from the key object 100 is correct, the login process to the PC 200 is completed and the transition to a state that can use the PC 200 is performed.

When the authentication process between the key object 100 and the PC 200 is performed using the public-key authentication scheme, the challenge-and-response authentication is performed between the key object 100 and the PC 200 in step S106. The key object 100 transmits the matching of authentication permission information to the PC 200. The PC 200 generates a challenge using the public key corresponding to the secret key held by the key object 100 in response to receiving the matching of authentication permission information and transmits the challenge to the key object 100. The key object 100 generates a response to the challenge received from the PC 200 using the secret key stored in the storage unit 150 and transmits the generated response to the PC 200 as a reply. The PC 200 verifies the response received from the key object 100. If the response is one generated using the secret key corresponding to the public key, the PC 200 determines that the user of the key object 100 has the authority to use the PC 200, and the login process to the PC 200 is completed and the transition to a state that can use the PC 200 is performed.

The key object 100 according to an embodiment of the present disclosure that performs a series of processes described above makes it possible to perform the authentication process with the PC 200 using the authentication information corresponding to the shape that is set previously. The shape of the key object 100 is determined in using the information used for the authentication process depending on the user's intended use and preferences, and thus it is possible to identify easily the user's own possession or usage.

An operation example of the key object 100 according to an embodiment of the present disclosure has been described with reference to FIG. 8.

Although the above example shows a case where the selection of an authentication destination is mainly based on the shape of the key object 100 as the state of the key object 100, an embodiment of the present disclosure is not limited thereto. The key object 100 may acquires an order in which a portion is deformed and the number of deformation, in addition to the direction at which a portion is deformed, through the sensor unit 160. The key object 100 may acquire, as the state of the key object 100, difference between ways of deforming, such as rotating, extending, squeezing, twisting, bending, connecting, and fastening a part, through the sensor unit 160, in addition to the case where no part is changed. The key object 100 may acquire a state of being in contact with the surface as the state of the key object 100 through the sensor unit 160. If the state of being in contact with the surface is acquired, the key object 100 may also acquire the number of user's fingers through the sensor unit 160.

When the key object 100 is an object like a doll with a part such as hands and feet movable freely as one example, the key object 100 can acquire a state of each part, an object's shape (standing, sitting, etc.) obtained from the state of the part, the presence or absence of rotation of the part and the number of rotation of the part upon rotation, difference in the touched parts, the order being touched, or the like, as the state of the key object 100.

Figure 10A:
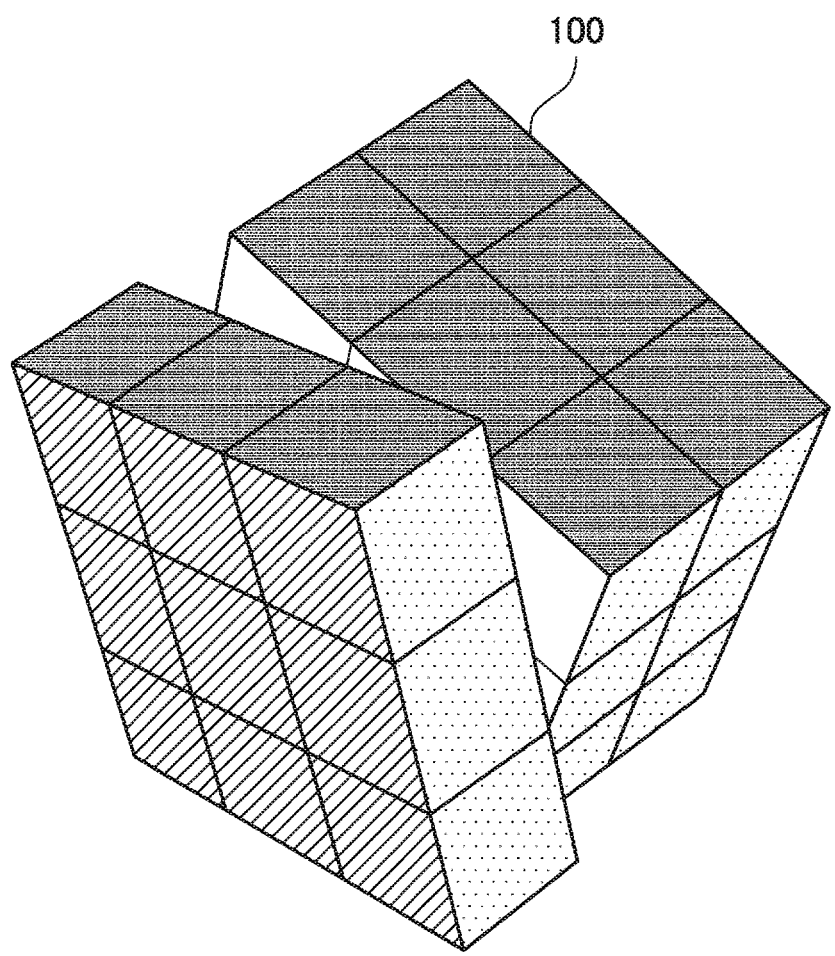
FIG. 10A is a diagram illustrated to describe another example of the key object 100.

When the key object 100 is a cubic puzzle in which each of six faces is divided into nine portions and each face is aligned in one color by rotating it as shown in FIG. 10A, the key object 100 can acquire a point to rotate, direction of rotation, number of rotation, color being aligned, difference in touched colors in a state where color of each face is aligned, or the like, as the state of the key object 100. Examples of the case where the difference in touched colors in a state where color of each face is aligned or the like is acquired as the state of the key object 100 may include a case where touch to a single color is acquired and a case where simultaneous touch to a plurality of colors is acquired.

Figure 10B:
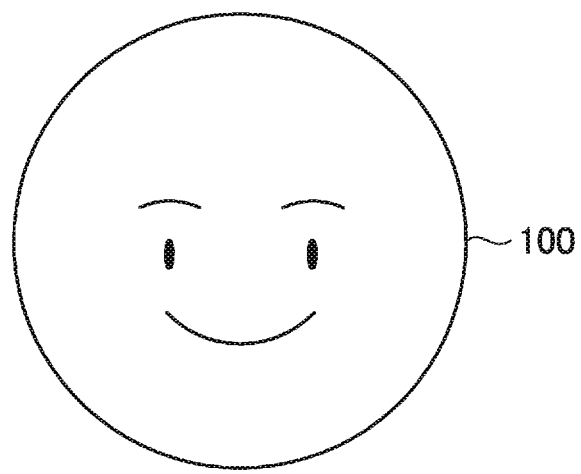
FIG. 10B is a diagram illustrated to describe another example of the key object 100.
Figure 10B:
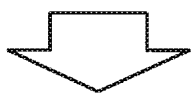
Figure 10B:
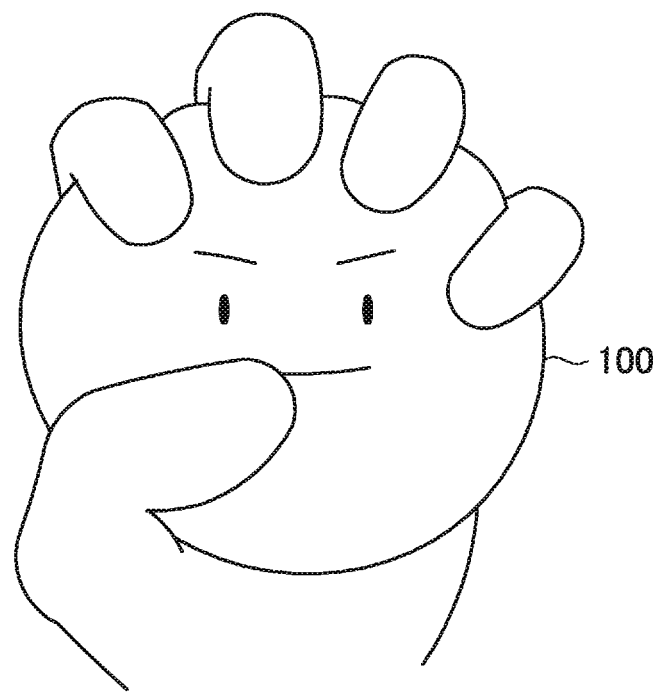

When the key object 100 is an object such as a soft ball shown in FIG. 10B as one example, the key object 100 can acquire a deformed portion, a deformed state (being extended, squeezed, twisted, etc.), the number of hands used for deformation, or the like, as the state of the key object 100. When the key object 100 is an object such as a wire as one example, the key object 100 can acquire a deformed portion, a deformed state (being extended, squeezed, twisted, etc.), a touched position, the number of fingers being touched, or the like, as the state of the key object 100. When the key object 100 is an object such as a string as one example, the key object 100 can acquire a way to tie, a position to tie up, a touched position, the number of fingers being touched, or the like, as the state of the key object 100.

Figure 11:
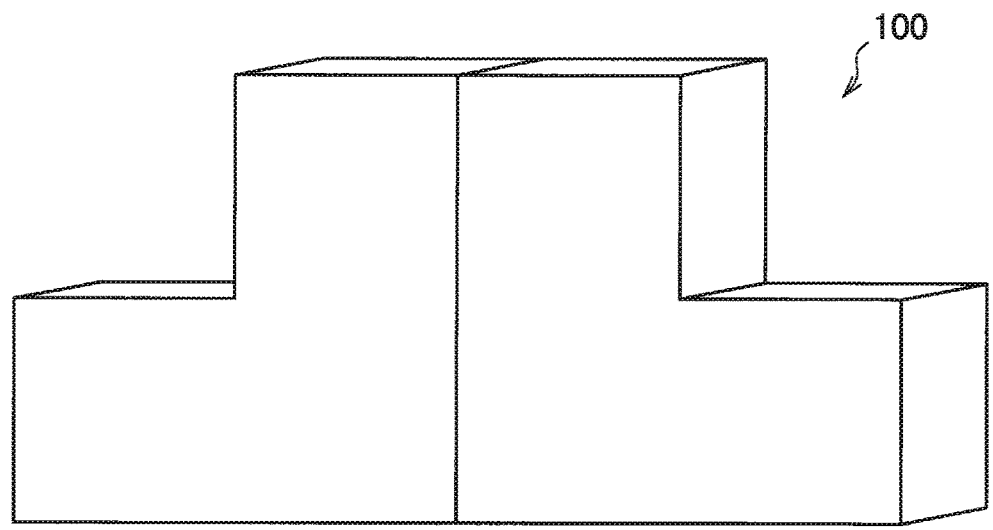
FIG. 11 is a diagram illustrated to describe another example of the key object 100.
Figure 11:
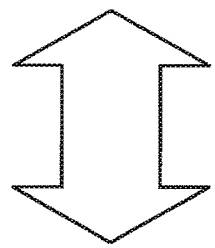
Figure 11:
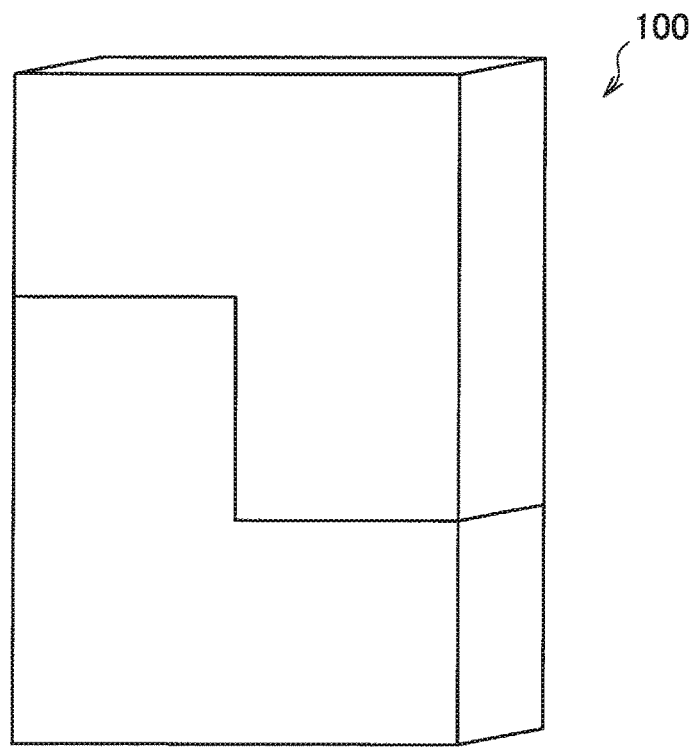

When the key object 100 is an object intended to combine a plurality of objects into a single object with one shape as one example, the key object 100 can acquire a shape formed depending on difference in the ways to combine them, as the state of the key object 100. FIG. 11 is a diagram illustrated to describe an appearance example of the key object 100. The key object 100 shown in FIG. 11 is composed of two parts, and the key object 100 is an object that can have a shape varied depending on the ways to combine these components. As illustrated in FIG. 11, when the key object 100 is an object having different shapes depending on difference in the ways to combine, the key object 100 may switch the authentication destination depending on the respective combination ways to select the authentication information.

The key object 100 according to the present embodiment as illustrated in FIG. 5 can classify a plurality of authentication destinations into a group to assign them to a single object shape ID. Even when the key object 100 according to the present embodiment has the same shape, the key object 100 may change the authentication destination depending on difference in the object's state, for example, inclination of the object. In other words, the authentication destination may be switched depending on the state including inclination or the like of the key object 100 in the same group.

When the key object 100 acquires an object shape ID by recognizing the shape of the key object 100 as one example, the key object 100 may acquire inclination of the key object 100 through the sensor unit 160 and may select another authentication destination depending on the inclination. Then, the key object 100 can switch authentication destination into the other authentication destination and select authentication information to be used. More specifically, in the case where the key object 100 is a doll, if there are three authentication destinations for the object shape ID corresponding to the state in which the doll is sitting, the key object 100 may select one or two of the three authentication destinations when the doll is laid down without change in the hands or feet.

Even when the key object 100 according to the present embodiment has the same shape, the key object 100 may change the authentication information to be used depending on difference in the state, for example, inclination of the object. As one example, in the case where the key object 100 is a doll, even when the state of its face, arms, and legs are the same, the authentication information to be used may vary depending on whether the doll is sitting or sleeping. In other words, when the doll as the key object 100 is sitting, the authentication information for logging in to the PC 200 is used as an example. When the doll is sleeping, the authentication information for logging in to a service on an interface to be used via the PC 200.

In this way, it is possible to acquire various types of information as the state of the key object 100 depending on an object that constitutes the key object 100. It is possible for the key object 100 to perform the authentication process with a device at the authentication destination (e.g., the PC 200) by selecting the authentication information depending on the state of the key object 100.

[2.4. Registration Example of Authentication Information]

The key object 100 according to the present embodiment can associate the state of the key object 100, for example, the shape of the key object 100 with the authentication destination. An example of a user interface in associating the state of the key object 100 with the authentication destination will be described.

Figure 12:
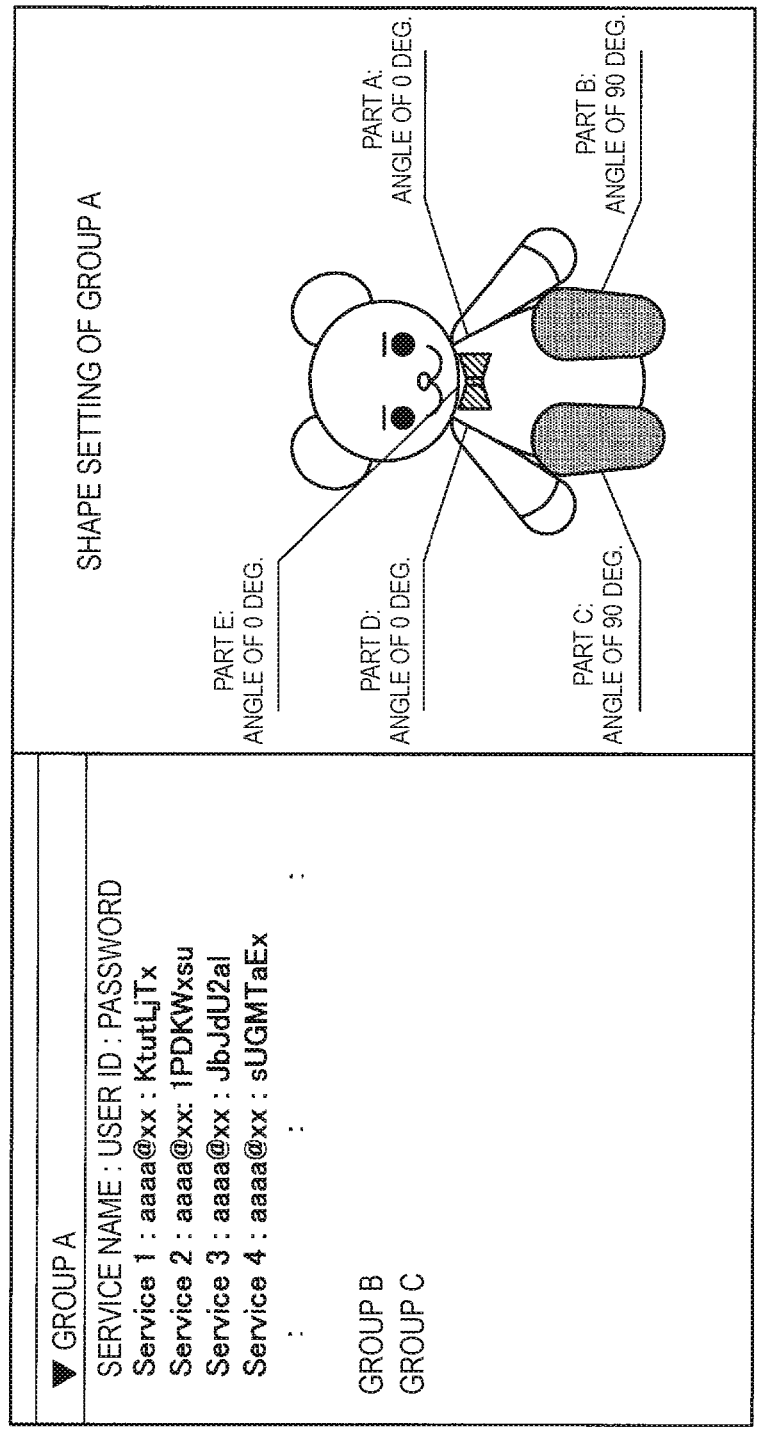
FIG. 12 is a diagram illustrated to describe an example of a user interface.

FIG. 12 is a diagram illustrated to describe an example of a user interface when the state of the key object 100 is associated with the authentication destination. The user interface may be implemented by a device different from the key object 100, for example, the PC 200, or may be implemented by a device that is independent of the authentication between the key object 100 and the PC200 (PC, smartphone, tablet terminal, etc.).

FIG. 12 illustrates an example in which the user interface classifies a plurality of authentication destinations into a group and the shape of the key object 100 is set for each group. In FIG. 12, an image of the key object 100 is displayed. The example of FIG. 12 shows the case in which the key object 100 is a doll and five parts A, B, C, D, and E are rotatable. The part A is the left arm of the doll, the part B is the left leg of the doll, the part C is the right leg of the doll, the part D is the right arm of the doll, and the part E is the neck of the doll.

FIG. 12 shows an example of a case where four services are grouped into one group A as the authentication destination, and the parts A, D, and E are set at an angle of 0 degree and the parts B and C are set at an angle of 90 degrees as the shape of the group A. When the angle of each part is set, the image of the key object 100 may be shown so that the part corresponding to the set angle is displayed. FIG. 12 shows a state of displaying the image corresponding to the key object 100 with the parts A, D, and E set at an angle of 0 degree and the parts B and C set at an angle of 90 degrees. In setting the shape of the key object 100, a restriction that one service is to be corresponded to only one shape may be provided.

If setting up the angle of each part is completed, a device in which the user interface is running and the key object 100 are connected via wireless or wired connection, and setting information is transmitted from the device to the key object 100. Then, the setting information is transmitted to the key object 100 and is stored in the key object 100.

The angle of each part may be set in more detail. However, if the setting of the angle is excessively detailed, even though the user intends to move each part through a proper angle, in some cases, the part actually rotates through an angle different from the intended one. As one example, the user intends to rotate the part A over an angle of 30 degrees, but it is likely to be recognized by the key object 100 that the angle of the part A is 45 degrees. In a case where the key object 100 includes the object shape ID in which the part A is set at an angle of 45 degrees, even when the part A is intended to be rotated over an angle of 30 degrees, an authentication destination different from the user's intention may be selected.

Thus, in setting an angle of each part of the key object 100, as one example, a restriction in which the angle is to be set only at an angle unit of 45 or 90 degrees may be provided. Placing such a restriction makes it possible to prevent the authentication destination that is not intended by the user from being selected.

When the angle of each part of the key object 100 is set, a restriction that the angle setting of at least two parts is to be different from other settings may be provided. In other words, as shown in FIG. 12, when the parts A, D, and E are set at an angle of 0 degree and the parts B and C are set at an angle of 90 degrees as the shape of the group A, a restriction that only the part A is to be prevented from being changed may be provided as the shape of another group. Similarly, placing such a restriction makes it possible to prevent the authentication destination that is not intended by the user from being selected.

Although the example shown in FIG. 12 illustrates the user interface in the case where the angle of each part of the key object 100 is set, an embodiment of the present disclosure is not limited thereto. As the interface used in associating the state of the key object 100 with the authentication destination, any types of information that can be acquired as the state of the key object 100 may be set. Examples of such information include inclination of another key object 100, a position that is in contact with the key object 100 or the number of fingers that are in contact with it, a deformed portion or deformed state (extended, bended, twisted, etc.) of the key object 100, a pressed position on the key object 100, and a shape of the key object 100.

<3. Conclusion>

An embodiment of the present disclosure described above provides the key object capable of performing the authentication process with the device at the authentication destination using authentication information corresponding to the preset shape and other states. The key object according to an embodiment of the present disclosure includes a member (chip) equipped therein, in which key information can be registered or is available, and thus it is difficult to be recognized as being a key by others people who are looking at it.

The key object according to an embodiment of the present disclosure allows a holder to register which part of the key object is to be changed and how to deform and/or operate it to log in to the authentication destination and to lock or unlock it. Thus, it is difficult for any person other than the holder of the key object to know how to deform and/or how to operate it to log into the authentication destination and to lock or unlock it.

The key object according to an embodiment of the present disclosure can change a way to operate it depending on the part of the key object and can register logging into the authentication destination and the locking or unlocking of it. Thus, it is possible to register log in to a plurality of authentication destinations and to lock or unlock them by one key object. Thus, the key object according to an embodiment of the present disclosure has advantages that it is not necessary to hold a plurality of keys even when the number of authentication destinations increases.

The key object according to an embodiment of the present disclosure allows a holder to register which part of the key object is to be changed and how to deform and/or operate it to log in to the authentication destination and to lock or unlock it. Thus, this advantageously causes the holder to be difficult to forget how to operate each object. The key object according to an embodiment of the present disclosure includes a member (chip) equipped therein, in which key information can be registered or is available, and thus an object having the user's favorite shape can be advantageously used as the key object. Thus, it is possible to use an object having a shape different from that of others as the key object, which leads to an effect of causing it to be difficult to recognize that other people manage a key object.

The steps in the processes performed by each apparatus in the present specification may not necessarily be processed chronologically in the orders described in the sequence diagrams and the flowcharts. For example, the steps in the processes performed by each apparatus may be processed in different orders from the orders described in the flowcharts or may be processed in parallel.

Also, a computer program causing hardware such as a CPU, a ROM, and a RAM included in each apparatus to carry out the equivalent functions as the above-described configuration of each apparatus can be generated. Also, a storage medium having the computer program stored therein can be provided. Also, by configuring each functional block illustrated in the functional block diagram as hardware, the series of processes can also be realized by the hardware. Also, the computer program can be distributed as a dedicated application program for various information processing terminals such as smartphones or tablets from a predetermined application distribution site on a network such as the Internet. The application distribution site can be provided by a server apparatus including a storage apparatus that stores a program and a communication apparatus that transmits the application program in response to a download request from clients (various information processing terminals such as smartphones or tablets).

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

As one example, in the above embodiments, the key object 100 acquires its own state and selects authentication information to be used based on the acquired state of the key object 100, but an embodiment of the present disclosure is not limited thereto. A device other than the key object 100 (e.g., the PC 200 or a device for performing an authentication process with the PC 200) may acquire the state of the key object 100, and the other device may select authentication information to be used based on the acquired state of the key object 100 and may perform the authentication process.

As one example, when the PC 200 acquires the state of the key object 100, the communication unit 230 may function as the state acquisition unit according to an embodiment of the present disclosure configured to communicate with the key object 100 and acquire the state of the key object 100. In this case, the controller 240 may function as the authentication information acquisition unit according to an embodiment of the present disclosure configured to the authentication information based on the state of the key object 100 or the authentication unit according to an embodiment of the present disclosure configured to perform the authentication process using the authentication information.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

An information processing system including:

a state acquisition unit configured to acquire information on a state of an object; and an authentication information acquisition unit configured to acquire authentication information corresponding to the information on the state of the object acquired by the state acquisition unit.

(2)

The information processing system according to (1), further including:

an authentication processing unit configured to perform an authentication process using the authentication information acquired by the authentication information acquisition unit.

(3)

The information processing system according to (1) or (2), wherein the authentication information is information held by the object.

(4)

The information processing system according to (1) or (2), wherein the authentication information is information held by a device different from the object.

(5)

The information processing system according to any one of (2) to (4), wherein the object has at least a portion that is deformable, and wherein the authentication processing unit performs the authentication process using the authentication information corresponding to a state in which the object is deformed.

(6)

The information processing system according to (5), wherein the state acquisition unit includes a first sensor configured to acquire information on the state of the object.

(7)

The information processing system according to (6), wherein the first sensor is a sensor configured to detect an angle of rotation of a rotatable part of the object.

(8)

The information processing system according to (6), wherein the first sensor is a sensor configured to detect a sensor for detecting a pressure applied to the object.

(9)

The information processing system according to any one of (6) to (8), wherein the state acquisition unit further includes a second sensor different from the first sensor.

(10)

The information processing system according to (9), wherein the first sensor is a sensor configured to detect an angle of rotation of a rotatable part of the object, and the second sensor is a sensor configured to detect a pressure applied to the object.

(11)

The information processing system according to (9), wherein the first sensor is a sensor configured to detect an angle of rotation of a rotatable part of the object, and the second sensor is a sensor configured to detect inclination of the object.

(12)

The information processing system according to any one of (1) to (11), wherein the object is composed by combining a plurality of components.

(13)

An information processing system including:

a state acquisition unit configured to acquire information on a state of an object; and an authentication information registration unit configured to register authentication information in association with the information on the state of the object acquired by the state acquisition unit, the authentication information being used for an authentication process.

(14)

The information processing system according to (13), wherein the authentication information registration unit registers a plurality of pieces of the authentication information in association with one piece of the information on the state of the object.

(15)

A computer program for causing a computer to execute:

acquiring information on a state of an object in which at least a portion is deformable; and acquiring authentication information that matches the acquired information on the state of the object, the authentication information corresponding to the information on the state of the object.

(16)

A computer program for causing a computer to execute:

acquiring information on a state of an object; and registering authentication information in association with the acquired information on the state of the object, the authentication information being used for an authentication process.

REFERENCE SIGNS LIST 100 key object
110 controller
111 state acquisition unit
112 authentication information acquisition unit
113 authentication processing unit
120 input unit
130 shape recognition unit
140 communication unit
150 storage unit
160 sensor unit
200 PC
210 input unit
220 output unit
230 communication unit
240 controller

The invention claimed is:

1. An information processing system, comprising:
a memory; and
circuitry coupled to the memory, wherein the circuitry is configured to:

associate each object identification (ID) of a plurality object identifications (IDs) with at least one authentication destination of a plurality of authentication destinations, wherein
each object ID of the plurality object IDs corresponds to each shape of a plurality of shapes of a physical object, wherein the physical object is deformed and altered into different shapes of the plurality of shapes;
register each shape of the plurality of shapes, its corresponding object ID, and at least one associated authentication destination with a set of authentication information;
acquire information on a first shape of the plurality of shapes of the physical object, wherein the acquired information comprises at least an object ID associated with the first shape;
compare the first shape of the physical object with a plurality of registered shapes of the physical object;
determine that the first shape corresponds to one of the plurality of registered shapes of the physical object;
acquire a set of authentication information corresponding to the first shape;
authenticate the acquired information on the first shape with the acquired set of authentication information corresponding to the first shape;
authenticate an authentication destination associated with the first shape with the acquired set of authentication information corresponding to the first shape;
upon positive authentication of the acquired information on the first shape and authentication of the authentication destination associated with the first shape,
grant access to the authentication destination associated with the first shape, wherein at least two authentication destinations of the plurality of authentication destinations correspond to the first shape of the physical object, and the at least two authentication destinations includes a computer and a web service.

2. The information processing system according to claim 1, wherein the acquired information on the first shape is held by the physical object.

3. The information processing system according to claim 1, wherein the set of authentication information is held by a device different from the physical object.

4. The information processing system according to claim 1, wherein the physical object has at least a portion that is deformable, and wherein the circuitry is further configured to authenticate a second acquired information based on authentication information corresponding to a second shape of the physical object in which the physical object is deformed.

5. The information processing system according to claim 4, wherein the circuitry includes a first sensor configured to acquire the information on the first shape of the physical object.

6. The information processing system according to claim 5, wherein the first sensor is configured to detect an angle of rotation of a rotatable part of the physical object.

7. The information processing system according to claim 5, wherein the first sensor is further configured to detect a pressure applied to the physical object.

8. The information processing system according to claim 5, wherein the circuitry further includes a second sensor different from the first sensor.

9. The information processing system according to claim 8, wherein the first sensor is further configured to detect an angle of rotation of a rotatable part of the physical object, and the second sensor is configured to detect a pressure applied to the physical object.

10. The information processing system according to claim 8, wherein the first sensor is configured to detect an angle of rotation of a rotatable part of the physical object, and the second sensor is configured to detect an inclination of the physical object.

11. The information processing system according to claim 1, wherein the physical object comprises combination of a plurality of components.

12. An information processing method, comprising:
    associating each object identification (ID) of a plurality object identifications (IDs) with at least one authentication destination of a plurality of authentication destinations, wherein
        each object ID of the plurality object IDs corresponds to each shape of a plurality of shapes of a physical object, wherein the physical object is deformed and altered into different shapes of the plurality of shapes;
    registering each shape of the plurality of shapes, its corresponding object ID, and at least one associated authentication destination with a set of authentication information;
    acquiring information on a first shape of the plurality of shapes of the physical object, wherein the acquired information comprises at least an object ID associated with the first shape;
    comparing the first shape of the physical object with a plurality of registered shapes of the physical object;
    determining that the first shape corresponds to one of the plurality of registered shapes of the physical object;
    acquiring a set of authentication information corresponding to the first shape;
    authenticating the acquired information on the first shape with the acquired set of authentication information corresponding to the first shape;
    authenticating an authentication destination associated with the first shape with the acquired set of authentication information corresponding to the first shape;
    upon positive authentication of the acquired information on the first shape and authentication of the authentication destination associated with the first shape,
    granting access to the authentication destination associated with the first shape, wherein at least two authentication destinations of the plurality of authentication destinations correspond to the first shape of the physical object, and the at least two authentication destinations includes a computer and a web service.

13. The information processing method according to claim 12, wherein the method further comprises: registering a plurality of pieces of a set of authentication information in association with one piece of information on a shape of the physical object.

14. A non-transitory computer-readable medium having stored thereon computer-executable instructions that, when executed by a computer, cause the computer to execute operations, the operations comprising:
    associating each object identification (ID) of a plurality object identifications (IDs) with at least one authentication destination of a plurality of authentication destinations, wherein
        each object ID of the plurality object IDs corresponds to each shape of a plurality of shapes of a physical object, wherein the physical object is deformed and altered into different shapes of the plurality of shapes;
    registering each shape of the plurality of shapes, its corresponding object ID, and at least one associated authentication destination with a set of authentication information;
    acquiring information on a first shape of the plurality of shapes of the physical object, wherein the acquired information comprises at least an object ID associated with the first shape;
    comparing the first shape of the physical object with a plurality of registered shapes of the physical object;
    determining that the first shape corresponds to one of the plurality of registered shapes of the physical object;
    acquiring a set of authentication information corresponding to the first shape;
    authenticating the acquired information on the first shape with the acquired set of authentication information corresponding to the first shape;
    authenticating an authentication destination associated with the first shape with the acquired set of authentication information corresponding to the first shape;
    upon positive authentication of the acquired information on the first shape and authentication of the authentication destination associated with the first shape,
    granting access to the authentication destination associated with the first shape, wherein at least two authentication destinations of the plurality of authentication destinations correspond to the first shape of the physical object, and the at least two authentication destinations includes a computer and a web service.

* * * * *